2,993,872
AQUEOUS COMPOSITION COMPRISING WERNER COMPLEX, A STARCH, HYDROGENATED VEGETABLE OIL AND EMULSIFYING AGENT AND METHOD OF PREPARING SAME

Roland K. Gagnon, Manville, R.I., and Gerald E. Rammel, North Attleboro, Mass., assignors to Owens-Corning Fiberglas Corporation, a corporation of Delaware
No Drawing. Filed Dec. 23, 1957, Ser. No. 704,841
7 Claims. (Cl. 260—8)

This is a continuation-in-part of our copending application Serial No. 352,988, filed May 4, 1953, now abandoned, and entitled "Coated Fibrous Materials and Method of Making."

This invention relates to a new and improved size composition for use in the treatment of glass fibers and it relates more particularly to a composition of the type described for application as a size to glass fibers to improve their processing characteristics in the preparation of yarns and coated fibers or fabrics and to improve their performance characteristics by way of improved strength properties and abrasion resistance with less differential between the properties when dry and the properties when wet than is available with size compositions that have heretofore been used with glass fibers.

At the present time, with size compositions of the type described in United States Patents No. 2,245,620 and No. 2,371,933, the breaking strength when wet is about 50 percent of the value when dry. Similar loss is experienced as between wet and dry in flexure endurance and the abrasion resistance is reduced from a value of about 600 strokes dry to less than one-tenth the value or about 45 strokes when wet. It is desirable if possible not only to increase the strength, abrasion resistance and flexure endurance of glass fibers under dry conditions but it is even more important to improve the wet properties of glass fibers to reduce the differential between their properties when dry as compared to their properties when wet.

It is an object of this invention to provide an improved size composition for glass fibers and it is a related object to provide a method for producing same.

More specifically, it is an object of this invention to produce a size composition which improves the processing characteristics of the glass fibers in twisting for yarn formation and in the coating of the fibers and fabric formed thereof in the production of coated glass fiber products.

Another object is to produce a size composition of the type described which improves the performance characteristics of the glass fibers by the development of a better bonding relation between the treated glass fibers and the coating materials applied to the surfaces thereof in the preparation of coated glass fibers and fabrics and in the preparation of coated glass fibers and fabrics and printed glass fibers and fabrics.

A further object is to produce a size composition of the type described which improves the characteristics of the fibers under wet conditions as by reducing the differential between the glass fibers in the wet and the dry state and which results in the production of sized glass fibers having physical properties when either dry or wet which are beyond the values heretofore obtainable with comparable glass fiber structures.

It has been found that the properties desired in glass fibers and fabrics formed thereof are secured by the treatment of glass fibers with size compositions of the type described in the aforementioned patents in combination with a Werner complex compound in which the acido group coordinated with the trivalent nuclear chromium atom contains more than 10 carbon atoms. The acido group is preferably in the form of a saturated or unsaturated fatty acid group containing from 14–18 carbon atoms, such as the fatty acid group of stearic acid, palmitic acid, linoleic acid, oleic acid, castor oil acids and the like represented by stearato chromic chloride.

While improvements of a substantial character are secured merely by the incorporation of the chromic complex compound to size compositions of the type described formulated of a partially dextrinized starch in amounts ranging from 3–10 percent, natural or partially hydrogenated fats and waxes in amounts ranging from 3–10 percent, and an emulsifying agent in amounts ranging from 0.1–10 percent, as described in Patent No. 2,245,620, or compositions of the types described in Patent No. 2,371,933, it has been found that unexpected improvements in processing and in performance characteristics are secured when the chromic complex compound is incorporated in a size composition containing one or more additional materials, such as gelatin in amounts ranging from 0.03–2.0 percent by weight and polyvinyl alcohol in amounts ranging from 0.05–1.0 percent by weight, and a cationic softening agent, such as a fatty acid sulfonate in amounts ranging from 0.4–4.0 percent by weight.

Mere additions of the chromic complex compound to compositions of the type described are effective to improve the physical characteristics and properties of the treated glass fibers but it is desirable, in order to develop optimum characteristics, to embody the Werner complex compound into the size compositions in a manner partially to polymerize the compound so that the subsequent heating to set the size on the glass fiber surfaces will be sufficient to effect additional polymerization of the chrome complex for insolubilization and for the development of the desired physical properties. Partial polymerization of the type described can be achieved as an incidence to the preparation of the size composition preferably by the dilution of the chrome complex (usually in solution in alcohol) with aqueous medium heated to a temperature within the range of 180° F. up to boiling and preferably at or about boiling temperature. Best results are secured when this hot solution of the chrome complex compound in aqueous medium is combined with the partially dextrinized starch during solution thereof in aqueous medium while the latter is heated to elevated temperature, and preferably while the mixture of starch and water is at a temperature of about 200° F.

The improvements described in size compositions embodying features of this invention are secured by the addition of the Werner complex compounds in amounts ranging from 1–10 percent by weight. Optimum results with compositions of the type described have been secured when the Werner complex compound is present in an amount ranging from 3–6 percent by weight in the size composition.

Application of the size composition may be made by conventional means as by a roll applicator, or wiping pad to coat the individual fibers in forming. In the alternative, fibers already formed can be treated by a dip process or the like but preferably after the size previously applied has been removed, as by burning off or by a wash process. The size compositions containing the chrome complex compound in the concentration described will have a pH within the range of 2.5–5.0. Less corrosion or rust of metal parts occurs at higher pH levels, but the amount of corrosion remains insignificant even at the lower pH levels.

The following will illustrate the formulation of a size composition embodying the features of this invention:

Example 1

8.0 percent by weight partially dextrinized starch
1.8 percent by weight hydrogenated vegetable oil (hydrogenated soya bean oil)
0.2 percent by weight emulsifying agent (polyglycol ester of stearic acid)
0.6 percent by weight cationic softener (octadecylamine acetate)
0.1 percent by weight polyvinyl alcohol
0.05 percent by weight gelatin
5.0 percent by weight stearato chromic chloride
84.25 percent by weight water In preparation, the stearato chromic chloride usually supplied in solution in alcohol is diluted with about twice its weight of boiling water. This solution is then added during preparation of the starch solution when the latter is at its highest temperature, which may be about 200° F. If the stearato chromic chloride solution contains alcohol, it will have a tendency to cause foaming when added to the hot water and precautions should be taken therefore during this initial dilution. The oil as a dispersion and the remainder of the ingredients may thereafter be incorporated in any sequence for combination with the solution of the now partially polymerized stearato chromic chloride and partially dextrinized starch in aqueous medium.

The composition had a pH of about 2.5–3.0 and a solids contents of about 12 percent. Because of the relatively high solids content of a size composition of the type described, the pick-up on the fibers of the yarn was somewhat greater than that heretofore secured with normal size compositions for glass fibers and averaged about 1.7 percent solids on the yarn as compared to about 1.5 percent for a size composition of the type which will hereinafter be described in Example 3.

Example 2

7.0 percent by weight partially dextrinized starch in 15% solution
2.0 percent by weight hydrogenated vegetable oil (hydrogenated cocoanut oil)
0.4 percent by weight cationic wetting agent (tetraethylene pentamine stearic acid condensate)
0.3 percent by weight emulsifying agent (methylphenol-ethylene oxide condensate) or (sorbitan monolaurate)
3.0 percent by weight palmito chromic chloride
87.3 percent by weight water The materials for the above size composition may be incorporated in the same order by first diluting the chrome complex compound with an amount of water heated to boiling and then incorporating this solution into the heated solution of the starch in aqueous medium before the other ingredients are incorporated.

In addition to cocoanut oil and soya bean oil, the hydrogenated vegetable oils in the above compositions may include peanut oil and the like hydrogenated vegetable oils. The emulsifying agent may further be selected of such materials as fatty acid sulfonates, polyglycol esters of fatty acids, polyhydric alcohol esters of high molecular weight mineral organic acids, fatty acid alkylol amines, or sorbitan monostearate, sorbitan monooleate and the like. Representative further of an emulsifying agent which may be used is the acid ester of a polyethylene glycol. The softening agent or cationic wetting agent may further be selected of a cationic compound of the type lauryl amine acetate, dodecylamine oxide, diheptadecyl imidazoline acetate or diethyl acetamide or the like. The partially dextrinized starch employed in Examples 1 and 2 may be selected of such materials as are identified in the trade as globe gum or dextrine.

The vast improvement secured by the use of compositions embodying the Werner complex compounds of the type described may be demonstrated most emphatically by comparison with size compositions of the type heretofore employed, the major difference being in the absence of the chrome complex. The following will represent a size composition of the type heretofore employed such as is representative of the aforementioned United States patents:

Example 3

7.0 percent by weight partially dextrinized starch in 15% solution
2.0 percent by weight hydrogenated vegetable oil (hydrogenated soya bean oil)
0.4 percent by weight cationic wetting agent (octadecylamine acetate)
0.3 percent by weight emulsifying agent (polyglycol ester of stearic acid)
90.3 percent by weight water For purposes of comparison, a glass fiber yarn identical in all instances was sized in forming with a composition of Example 1 and the same type of yarn was also sized in forming with a composition of Example 3. The treated glass fibers were conditioned for testing at 72° F. and 55 percent relative humidity. Determinations by standard procedures listed in the following table were made for flexure endurance, abrasion resistance, and breaking strength both in the wet and dry state. The sized fibers were also coated with an identical resinous composition for the production of coated fibers or coated fabrics and the coated fibers after proper treatment were tested for capillarity which is determinative of the bonding relation existing between the coating composition and the glass fiber surfaces. The following is a table of the results which have been secured in testing glass fiber yarns of a weight to provide 150 yards per pound:

| Properties | Composition | | Test method |
| --- | --- | --- | --- |
| | Example 1 | Example 3 | |
| Flexure Endurance,[1] Strokes: | | | TY558F |
| Dry | 1,129 | 882 | |
| Wet | 1,114 | 436 | |
| Abrasion Resistance,[1] Strokes: | | | TY523G |
| Dry | 725 | 517 | |
| Wet | 187 | 28 | |
| Breaking Strength, Lbs.: | | | TY136C |
| Dry | 28.4 | 24.6 | |
| After 24 hrs. in water | 22.8 | 18.0 | |
| Ignition Loss, percent | 1.7 | 1.5 | TY517M |
| Capillary Rise, In. in 2 hours | 0 | .58 | T525H |

[1] Middle 6 of 10 method—10 oz. weights.

In flexure endurance, fibers treated with a composition embodying features of this invention gave an increase of about 30 percent over the value secured with the size composition of Example 3, which is representative of sizes which have heretofore been employed in the treatment of glass fibers. In the wet state, the loss of strength as compared to the dry state was negligible with glass fibers treated with the composition of Example 1 but with the composition of Example 3, the loss in strength was greater than 50 percent. On the basis of wet strength, fibers treated in accordance with the practice of this invention had 250 percent greater than fibers treated with a size composition of the type heretofore employed.

Equally noticeable improvements were secured in abrasion resistance. Fibers treated in accordance with the practice of this invention had 40 percent more abrasion resistance. With a conventional size the abrasion resistance wet was 1/20 the dry value while the loss is only in the order of 1/4 with glass fibers treated with the composition of Example 1. By comparison of these values secured in abrasion resistance while wet, it will be apparent that glass fibers treated with compositions of the type heretofore employed have 1/5 to 1/7 the abrasion resistance as compared to glass fibers treated in accordance with the practice of this invention. Comparable improvements are also secured in breaking strengths with the loss in strength wet being of lesser magnitude with fibers treated with the improved composition than with fibers treated with conventional size compositions heretofore employed.

While the improvements in physical properties are significant especially in resistance to loss in physical properties when wet, noticeable improvements are also secured in processing characteristic of glass fibers treated with the improved size composition.

In present practice for coating glass fiber yarns and fabrics with resinous materials, the sized fibers are usually treated with a silicone, such as the Dow-Corning material DC–1205, to condition the fibers to provide for better adhesion of the coating resin and to develop water repellency so that moisture will have less effect on the properties of the coated fibers or fabrics. The silicone treatment greatly increases the cost of the operation by reason of the expense for materials and for the extra steps in the application and baking to set the organosilicon compounds on the glass fiber surfaces. The silicone treatment also appears to impart undesirable properties to the yarn as by causing an increase in fuzziness which makes coating more difficult and which produces an unattractive coating.

When glass fibers are treated with a size composition embodying features of this invention, sufficient improvement is secured in water repellency and in the bonding relation of the coating resin to enable the elimination of the silicone treatments of the type heretofore employed. The coating which is secured without the silicone treatment is as good, if not better than that heretofore capable of being obtained with the additional silicone treatment and with a considerable savings in time, materials and labor.

The improved bonding and water repellency is not only exhibited by the physical properties and the appearance of the coating but is demonstrated further by the differences in capillarity of the coated fibers. Coated yarns sized with a composition embodying features of this invention provide no capillary rise upon immersion for two hours, while yarns sized with the composition of Example 3 and pretreated with a silicone before coating gives a capillary rise of about 0.58 inch after 2 hours immersion.

It will be apparent from the foregoing that a size composition embodying a Werner complex compound of the type described in combination with the other materials such as dextrinized starch, hydrogenated oils, softening and emulsifying agents and preferably embodying additional compositions such as gelatin and polyvinyl alcohol, form a new and improved composition which provides noticeable improvements both in processing and in performance characteristics of the glass fibers and yarns and fabrics formed thereof. While the most outstanding improvements are secured in retention of properties under wet conditions, improvements of the glass fibers and fabrics are also secured when tested under dry conditions.

The following example is representative of the scope of the materials which may be used in size compositions in combination with the Werner complex compounds in the manner described:

*Example 4*

3.0–10 percent by weight dextrine
1.0–10 percent by weight hydrogenated oils
0.1–10 percent by weight emulsifying agent (preferably of a non-ionic type)
0.4–4 percent by weight softening agent (cationic)
1.0–10 percent by weight Werner complex compound (stearato chromic chloride)
Remainder water In addition to the above, polyvinyl alcohol or other water soluble colloid in amounts ranging from 0.05–1.0 percent may be used and gelatin in amounts ranging from 0.03–2.0 percent may be used.

It will be understood that changes may be made in the details of formulation and method of application or subsequent treatment of the size compositions onto the glass fibers without departing from the spirit of the invention, especially as defined in the following claims.

We claim:

1. An aqueous composition for sizing glass fibers containing from 1–10 percent by weight of a Werner complex compound in which an acido group coordinated with a trivalent nuclear chromium atom contains from 10–18 carbon atoms in combination with the normal components of the size including from 3–10 percent by weight of a material selected from the group consisting of starch, and dextrinized starch, from 3–10 percent by weight of a hydrogenated vegetable oil lubricant, and from 0.1–10 percent by weight of an emulsifying agent.

2. An aqueous composition for sizing glass fibers containing 1–10 percent by weight of a Werner complex compound in which an acido group coordinated with a trivalent nuclear chromium atom contains from 10–18 carbon atoms in combination with the size ingredients including from 3–10 percent by weight of a material selected from the group consisting of starch, and dextrinized starch, from 3–10 percent by weight of a hydrogenated vegetable oil lubricant, from 0.1–10 percent by weight of an emulsifying agent, and from 0.4–4 percent by weight of a fatty acid cationic amine softening agent.

3. An aqueous composition for sizing glass fibers containing from 1–10 percent by weight of a Werner complex compound in which an acido group coordinated with a trivalent nuclear chromium atom contains from 10–18 carbon atoms in combination with 3–10 percent by weight of a partially dextrinized starch, 3–10 percent by weight of a hydrogenated vegetable oil lubricant, from 0.1–10 percent by weight of an emulsifying agent, from 0.4–4 percent by weight of a fatty acid cationic amine softening agent, from 0.03–2.0 percent by weight of gelatin, and from 0.05–1.0 percent by weight of polyvinyl alcohol.

4. The method of preparing an aqueous size composition for glass fibers containing 3–10 percent by weight of a material selected from the group consisting of starch, and dextrinized starch, 3–10 percent by weight of a hydrogenated vegetable oil lubricant, 0.1–10.0 percent by weight of an emulsifying agent, and 1–10 percent by weight of a Werner complex compound in which an acido group coordinated with a trivalent nuclear chromium atom contains from 10–18 carbon atoms, comprising the steps of adding water to form a solution of the Werner complex compound, heating the water solution of the Werner complex compound to a temperature of between 180° F. to boiling to advance the polymerization of the Werner complex compound, dissolving said material in aqueous medium by heating to a temperature between 180° F. and boiling and incorporating the hot solution of the Werner complex compound with the solution of said material while in its upper temperature range, and then adding the remainder of the ingredients of the size.

5. The method of preparing an aqueous size composition for glass fibers containing 3–10 percent by weight of a material selected from the group consisting of starch, and dextrinized starch, 3–10 percent by weight of a hydrogenated vegetable oil lubricant, 0.1–10 percent by weight of an emulsifying agent, 1–10 percent by weight of a Werner complex compound in which an acido group coordinated with a trivalent nuclear chromium atom contains from 10–18 carbon atoms, and 0.4–4.0 percent by weight of a fatty acid cationic amine softening agent, comprising the steps of adding water to form a solution of the Werner complex compound, heating the water solution of the Werner complex compound to a temperature of between 180° F. to boiling to advance the polymerization of the Werner complex compound, dissolving said material in aqueous medium by heating to elevated temperature and incorporating the hot solution of the Werner complex compound with the solution of said material while in its upper temperature range, and then adding the remainder of the ingredients of the size.

6. The method of preparing an aqueous composition for glass fibers in which the size composition contains 3–10 percent by weight of a material selected from the group consisting of starch, and dextrinized starch, 3–10 percent by weight of a hydrogenated vegetable oil lubricant, 0.3–2.0 percent by weight gelatin, 0.05–1.0 percent by weight polyvinyl alcohol, 0.1–10 percent by weight of an emulsifying agent, and 1–10 percent by weight of a Werner complex compound in which an acido group coordinated with a trivalent nuclear chromium atom contains from 10–18 carbon atoms, comprising the steps of adding water to form a solution of the Werner complex compound, heating the water solution of the Werner complex compound to a temperature of between 180° F. to boiling to advance the polymerization of the Werner complex compound, dissolving said material in aqueous medium by heating to elevated temperature and incorporating the hot solution of the Werner complex compound with the solution of said material while in its upper temperature range, and then adding the remainder of the ingredients of the size.

7. The method of preparing an aqueous composition for glass fibers in which the size composition contains 3–10 percent by weight of a material selected from the group consisting of starch, and dextrinized starch, 3–10 percent by weight of a hydrogenated vegetable oil lubricant, 0.3–2.0 percent by weight gelatin, 0.05–1.0 percent by weight polyvinyl alcohol, 0.1–10.0 percent by weight of an emulsifying agent, 0.4–4.0 percent by weight of a fatty acid cationic amine softening agent, and 1–10 percent by weight of a Werner complex compound in which an acido group coordinated with a trivalent nuclear chromium atom contains from 10–18 carbon atoms, comprising the steps of adding water to form a solution of the Werner complex compound, heating the water solution of the Werner complex compound to a temperature of between 180° F. to boiling to advance the polymerization of the Werner complex compound, dissolving said material in aqueous medium by heating to elevated temperature and incorporating the hot solution of the Werner complex compound with the solution of said material while in its upper temperature range, and then adding the remainder of the ingredients of the size.

References Cited in the file of this patent

UNITED STATES PATENTS

| | | |
|---|---|---|
| 2,245,620 | Steinbock | Jan. 17, 1941 |
| 2,552,910 | Steinman | May 15, 1951 |
| 2,650,184 | Biefeld | Aug. 25, 1953 |
| 2,726,164 | Eichmeier | Dec. 6, 1955 |